United States Patent [19]

Nakamura et al.

[11] Patent Number: 4,709,139
[45] Date of Patent: Nov. 24, 1987

[54] COMA CORRECTION IN OPTICAL HEAD WITH ASTIGMATISM FOR FOCUSING ERROR DETECTION

[75] Inventors: Akira Nakamura, Kanagawa; Hiroshi Oinoue, Tokyo; Tomoyuki Ishida, Tokyo; Kenji Shintani, Tokyo, all of Japan

[73] Assignee: Sony Corporation, Tokyo, Japan

[21] Appl. No.: 847,460

[22] Filed: Apr. 3, 1986

[30] Foreign Application Priority Data

Apr. 9, 1985 [JP] Japan ................................ 60-75059

[51] Int. Cl.⁴ .......................... G11B 21/10; G01J 1/20
[52] U.S. Cl. ........................................ 250/201; 369/44
[58] Field of Search ............... 250/201 AF, 201 DF, 250/204, 216; 350/170, 447; 369/44, 45

[56] References Cited

U.S. PATENT DOCUMENTS

| 2,868,066 | 1/1959 | Argyle | 350/447 |
| 4,410,241 | 10/1983 | de Lang et al. | 350/447 |
| 4,412,723 | 11/1983 | Shafer | 350/447 |
| 4,541,688 | 9/1985 | Watt et al. | 350/447 |

FOREIGN PATENT DOCUMENTS 0312927 7/1969 Sweden ........................ 350/447

Primary Examiner—David C. Nelms
Assistant Examiner—Stephone B. Allen
Attorney, Agent, or Firm—Lewis H. Eslinger; Alvin Sinderbrand

[57] ABSTRACT

In an optical head having a plate-like half mirror functioning both as a beam splitter and for producing an astigmatism usable in detecting a focusing error, an optical element is provided for correcting a coma introduced by the half-mirror. Such optical element for correcting coma desirably includes a plate-like element inclined oppositely to the plate-like half mirror in respect to an optical axis of the head.

5 Claims, 13 Drawing Figures

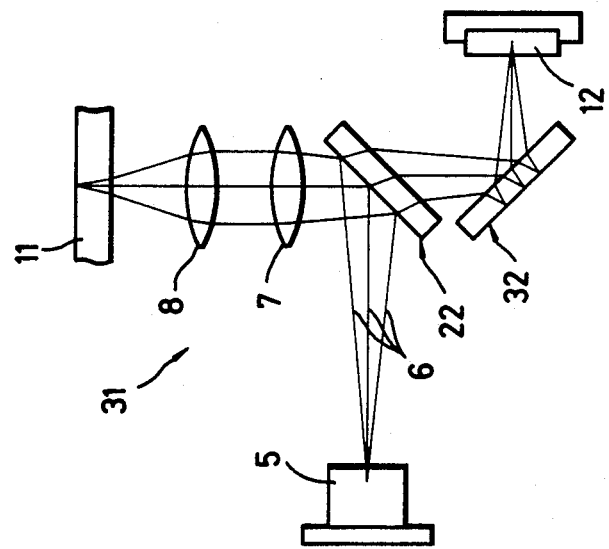

COMA CORRECTION IN OPTICAL HEAD WITH ASTIGMATISM FOR FOCUSING ERROR DETECTION

BACKGROUND OF THE INVENTION

1. Field of the Invention

The present invention relates to an optical head for example, for an optical recording/reproducing apparatus.

2. Description of the Prior Art

An optical head radiates light beams onto an optical recording medium while being focused thereon, and detects light beams therefrom. For this reason, when such an optical head is used, the beams must be split in different directions when they propagate forward and backward, and a focusing error must be detected. An astigmatic method is known as a method for detecting such a focusing error.

FIG. 1 shows a first conventional optical head which 1 comprises a cubic prism 2 combining rectangular prisms as a beam splitter, and a cylindrical lens 4 as an optical element for producing an astigmatism.

A light beam comprised of rays 6 emitted from a light source 5 passes through the cubic prism 2, a collimator lens 7, and an objective lens 8, and is incident on an optical recording medium 11. The rays 6 reflected from the optical recording medium 11 then pass through the objective lens 8 and the collimator lens 7, and are reflected by the prism 2 to be incident on a photodetector 12 through the cylindrical lens 4.

FIG. 2 shows a second conventional optical head 13, which has been disclosed in Japanese Patent Laying-Open No. 59-167863. In optical head 13, a plate-like half mirror 14 is used in place of the cubic prism 2 and the cylindrical lens 4.

The half mirror 14 is obtained by forming a translucent film on one surface of a transparent parallel-surface plate. When the half mirror 14 is arranged to be inclined with respect to converged light rays 6, as shown in FIG. 2, the rays 6 passing through the half mirror 14 cause an astigmatism. In other words, the half mirror 14 functions both as a beam splitter and to produce the astigmatism for detecting a focusing error.

However, in the first conventional optical head of FIG. 1, many optical elements (i.e., two triangular prisms constituting the cubic prism 2, and the cylindrical lens 4) are necessary for splitting the beams 6 and detecting the focusing error. Therefore, a relatively large number of individual parts and their assembly require high precision, resulting in increased cost of the optical head 1.

Although the second conventional optical head 13 of FIG. 2 requires only a small number of optical elements, so that its cost can be reduced, the half mirror 14 produces an undesirable coma in addition to the astigmatism.

FIGS. 3A to 3C show shapes of the beams comprised of rays 6 incident on the photodetector 12 when lenses having NA (numerical aperture values), of 0.47 and 0.14 are used for the objective lens 8 and the collimator lens 7, respectively, a 3-mm thick optical glass SF11 is used for the parallel-surface plate for the half mirror 14, and inclination of the half mirror 14 with respect to the optical axis of the beam 6 is set at 45°.

FIGS. 3A, 3B and 3C respectively show cases wherein the optical recording medium 11 is displaced toward the optical head 13 from an in-focus position by 10 μm, wherein the recording medium 11 is located at the in-focus position and wherein the recording medium is separated from the in-focus position in the direction away from the optical head 13 by 10 μm. As can be seen from FIGS. 3A, 3B, and 3C, the spot of the beam 6 on photodetector 12 is not symmetrical about the center of photodetecting portions a to d constituting the photodetector 12 due to the coma generated in the beam 6 incident on the photodetector 12 by inclined half mirror.

When the coma is generated in this manner, various problems are created for the optical head 13. For example, when the spot of the beam 6 is moved on the photodetector 12 for various reasons, the allowable range for deviation of the beam spot from a centered position is narrowed.

In addition, when only the objective lens 8 is moved for tracking servo control, the narrowed allowable range for deviation of the spot of the beam 6, correspondingly limits the movements of the objective lens 8, for maintaining correct tracking.

When a tracking error signal is obtained from a single spot of the beam 6, dependency of the signal on the recording medium 11 is exhibited to a considerable extent in addition to the above two problems, and the resultant signal is destabilized.

These problems narrow the margin for design of the optical head 13 associated with respective optical elements (e.g., not only of the half mirror 14, but also a nonsensitive band of the photodetector 12), and also in respect to the tracking error signal detection and the head actuator and so on. In addition, reliability of the optical head 13 is also degraded.

SUMMARY OF THE INVENTION

According to the present invention, in order to eliminate the above problems, there is provided an optical head comprising: a plate-like half mirror and an optical element for correcting a coma, wherein the beam from a light source is reflected by the half mirror and guided onto a collimator lens, and the beam, which returns from an optical recording medium and passes through the collimator lens also passes through the half mirror to produce an astigmatism, and is then incident on a photodetector through the optical element which eliminates the coma therefrom.

For this reason, in the optical head of the present invention, a plate-like half mirror serves as a beam splitter and produces an astigmatism for detecting a focusing error, and a coma produced by the plate-like half mirror is corrected by an optical element providing a coma in the opposite direction.

BRIEF DESCRIPTION OF THE DRAWINGS

FIGS. 1, 2 and 3 show prior art of the present

FIG. 1 is a side view of a first conventional optical head;

FIG. 2 is a side view of a second conventional optical head;

FIG. 8 is a side view of a second embodiment; and

FIG. 9 is an enlarged side view of an optical element in the second embodiment.

DETAILED DESCRIPTION OF THE PREFERRED EMBODIMENTS

Figure 2:
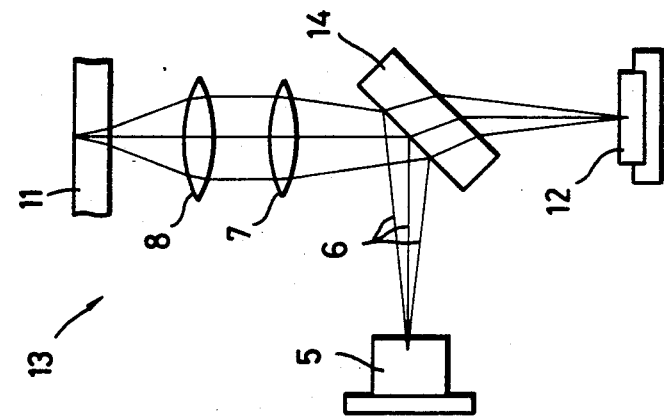
Figure 1:
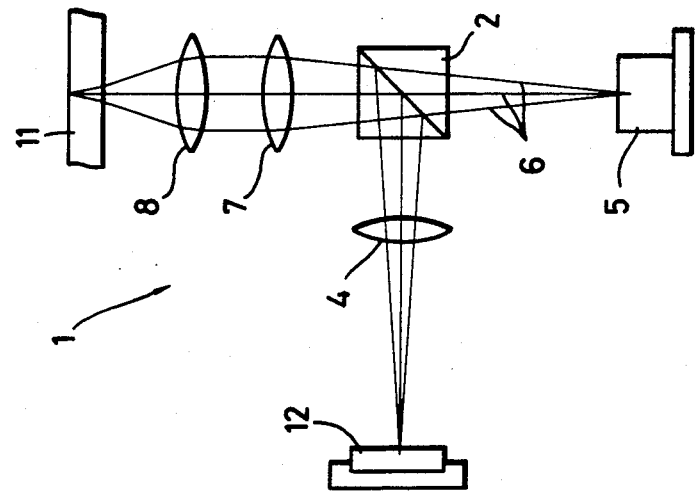
Figure 4:
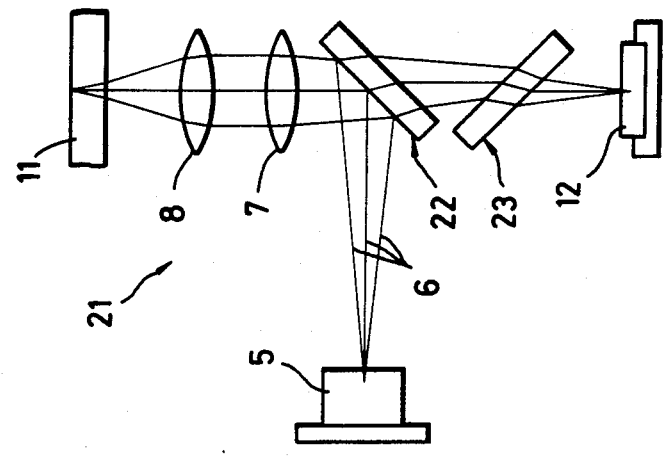
FIG. 4 is a side view of a first embodiment of the present invention.

Referring initially to FIG. 4, it will be seen that, in accordance with a first embodiment, an optical head 21 has substantially the same arrangement as the conventional optical head 13 of FIG. 2, except that a half mirror 22 and an optical element 23 are used in place of the half mirror 14.

Figure 6:
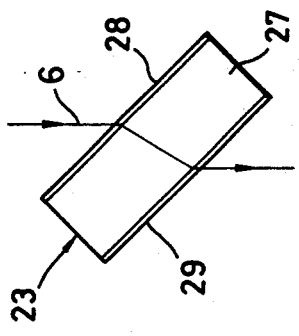
FIG. 6 is a side view of an optical element in the first embodiment, also shown on an enlarged scale.
Figure 5:
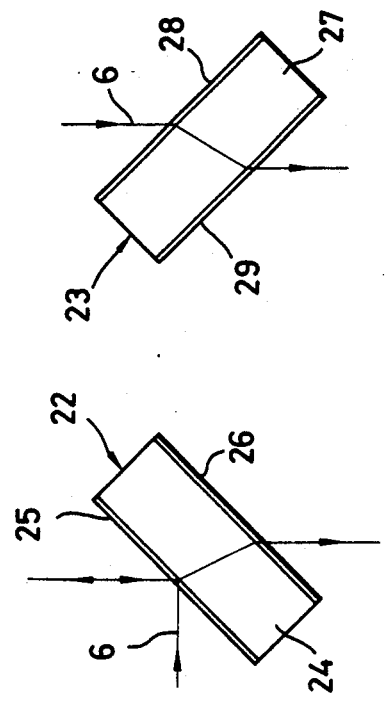
FIG. 5 is a side view of a half mirror in the first embodiment, but shown in an enlarged scale.

As shown in FIG. 5, the half mirror 22 has a multilayered deposition film 25 formed on one surface of a parallel-surface glass plate 24, and a reflection preventive film 26 formed on the other surface thereof. The optical element 23 has reflection preventive films 28 and 29 formed on two surfaces of a parallel-surface glass plate 27 of the same material and thickness as the plate 24, as shown in FIG. 6. As can be seen from FIG. 4, the half mirror 22 and the optical element 23 are inclined opposite to each other with respect to the optical axis of beam 6.

With the optical head 21 according to the first embodiment of the invention, the beam rays 6 are emitted from a light source 5 and reflected by the multilayered deposition film 25 of the half mirror 22, pass through a collimator lens 7 and an objective lens 8, and are then incident on an optical recording medium 11.

The beam rays 6 are then reflected by the recording medium 11 and pass through the objective lens 8, the collimator lens 7, the deposition film 25, the glass plate 24, and the optical element 23, and are then incident on a photodetector 12.

In this case, as can be seen from FIG. 4, the optical axis of the beam rays 6 between the optical element 23 and the photodetector 12 substantially coincides with that of the beam rays 6 between the recording medium 11 and the half mirror 22 because the beam rays 6 have passed through the optical element 23.

When the beam rays 6 pass through the half mirror 22 and the optical element 23, equal amounts of astigmatism and coma are produced therein in accordance with the same principle that produces them in the conventional half mirror 14. As previously described, however, the half mirror 22 and the optical element 23 are inclined oppositely with respect to the optical axis of the beam rays 6. Therefore, astigmatisms produced in the half mirror 22 and the optical element 23 are directed in the same direction, but comas produced therein are directed in opposite directions.

As a result, the coma can be eliminated from the beam 6 passing through the optical element 23, and the astigmatism therein is doubled when compared with the beam 6 passing through the half mirror 22.

Figure 3A:
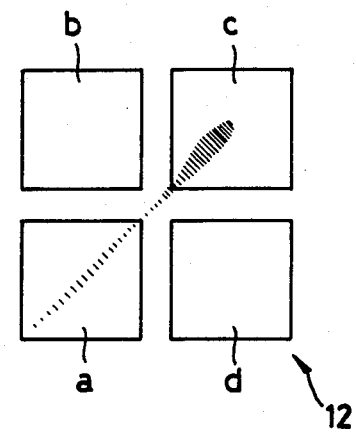
FIGS. 3A to 3C are plan views showing a beam spot on a photodetector in the second conventional optical head.
Figure 3B:
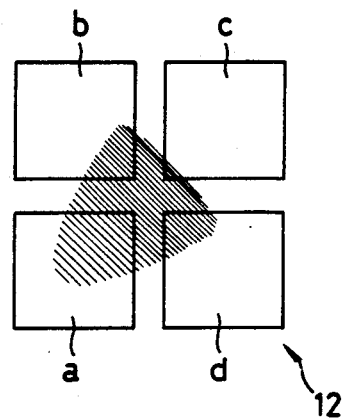
Figure 3C:
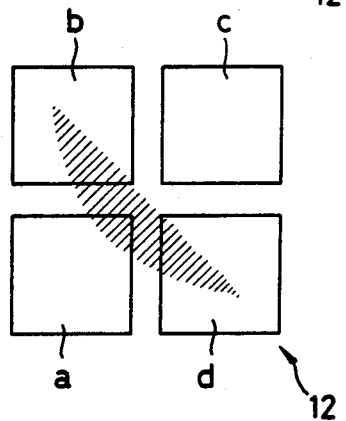
Figure 7A:
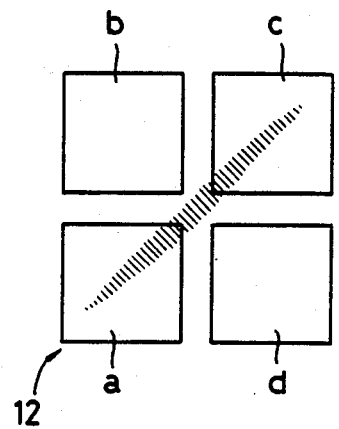
FIGS. 7A, 7B, 7C are plan views of a beam spot on a photodetector in the first embodiment.
Figure 7B:
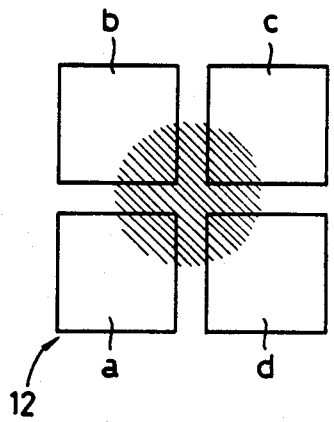
Figure 7C:
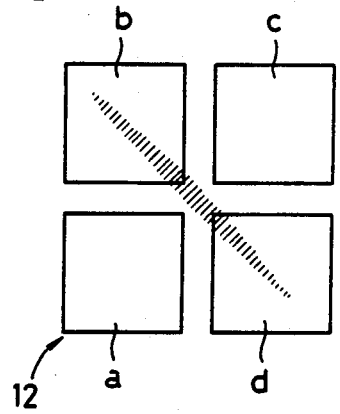

FIGS. 7A, 7B, and 7C show beam spots of the beam 6 incident on the photodetector 12 when, in the optical head 21, the same lenses as in the second conventional optical head 13 are used for the objective lens 8 and the collimator lens 7, 1.5-mm thick optical glass plates SF11 are used for the glass plates 24 and 27, and the half mirror 22 and the optical element 23 are inclined at ±45°, respectively, with respect to the optical axis of the beam 6. The conditions illustrated by FIGS. 7A, 7B, and 7C correspond with those described for FIGS. 3A, 3B, and 3C in connection with the conventional optical head 13.

As can be seen from FIGS. 7A, 7B, and 7C, the beam spots of the beam 6 are symmetrical about the center of photodetecting portions a to d constituting the photodetector 12, for all conditions. This demonstrates that the coma is eliminated from the beam 6 incident on the photodetector 12.

A focusing error signal is obtained by calculating $(a+c)-(b+d)$ from detection outputs of the photodetecting portions a to d, and a reproduction signal can be obtained by adding the detection outputs $(a+b+c+d)$.

FIG. 8 shows an optical head 31 according to a second embodiment of the present invention and which has substantially the same arrangement as that of the optical head 21 of the first embodiment, except that an optical element 32 is used in place of the optical element 23.

As shown in FIG. 9, optical element 32 includes a reflection preventive film 34 formed on one surface of a parallel-surface glass plate 33 of the same material as the glass plate 24 of the first embodiment but having a thickness half of that of plate 24, and a reflection film 35 formed on the other surface of plate 33.

The optical head 31 with the optical element 32 can be provided with a relatively small overall dimension in a direction perpendicular to an optical recording medium 11.

It is to be noted that the above optical heads 21 and 31 are merely specific embodiments of the present invention, and that the materials, thicknesses, inclinations, and the like of the half mirror 22 and the optical elements 23 and 32 are not limited to the examples thereof given, but can be changed within ranges which are consistent with correction of the coma.

Generally, in the optical head according to the present invention as described above, a plate-like half mirror serves as a beam splitter and generates an astigmatism for detecting a focusing error. A coma produced by the plate-like half mirror is corrected or compensated by an optical element.

Therefore, according to the present invention, a low-cost, highly reliable optical head can be provided.

What is claimed is:

1. In an optical head with astigmatism for focusing error detection and which directs a beam from a light source to be incident on an optical recording medium through a collimator lens and an objective lens, and further directs the beam from said optical recording medium to be incident on a photodetector through said objective lens and said collimator lens; the improvement comprising:

a plate-like half mirror arranged so that the beam from said light source is reflected by said half mirror and guided thereby onto said collimator lens, and the beam which returns from said optical recording medium passes from said collimator lens through said half mirror to produce said astigmatism for focusing error detection and is then incident on said photodetector; and a parallel-surface glass plate interposed in the path of the beam between said half mirror and said photodetector, said half mirror and parallel-surface glass plate being disposed in respective planes which intersect each other so that said parallel-surface glass plate increases said astigmatism and eliminates a coma arising from said half mirror.

2. An optical head according to claim 1, wherein said parallel-surface glass plate causes an optical axis of the beam between said parallel-surface glass plate and said photodetector to substantially coincide with the optical axis of said beam between said recording medium and said half mirror.

3. An optical head according to claim 1, wherein said parallel-surface glass plate has a first surface through which the beam incident on said parallel-surface glass plate is transmitted, and a second surface which is parallel to said first surface and which reflects the beam transmitted through said first surface.

4. An optical head according to claim 3, wherein said parallel-surface glass plate and said half mirror have bodies of the same transparent material, and a thickness of said body of the parallel-surface glass plate is half that of said half mirror.

5. An optical head according to claim 1, wherein said parallel-surface glass plate and said half mirror are of the same material and of the same thickness.

* * * * *